June 4, 1935.  F. WITTHUHN  2,003,986
ADJUSTABLE PLANT STAND
Filed April 7, 1934
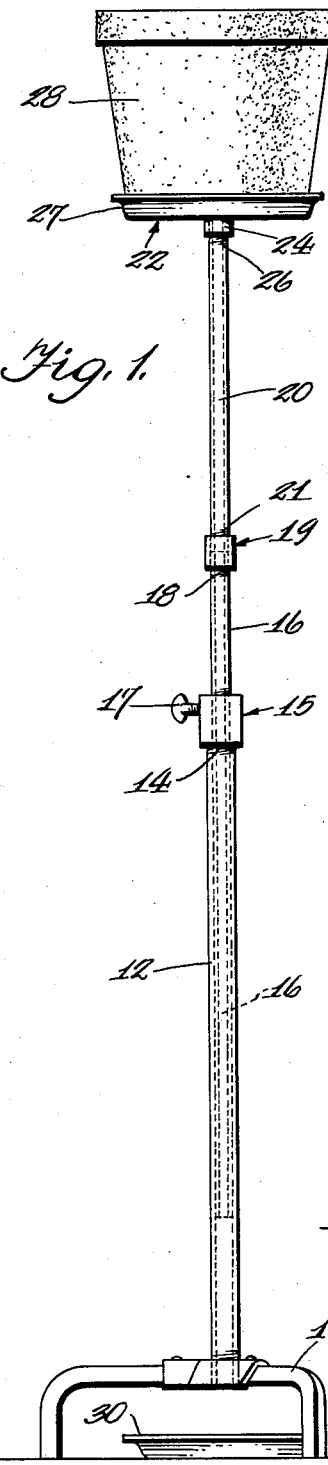
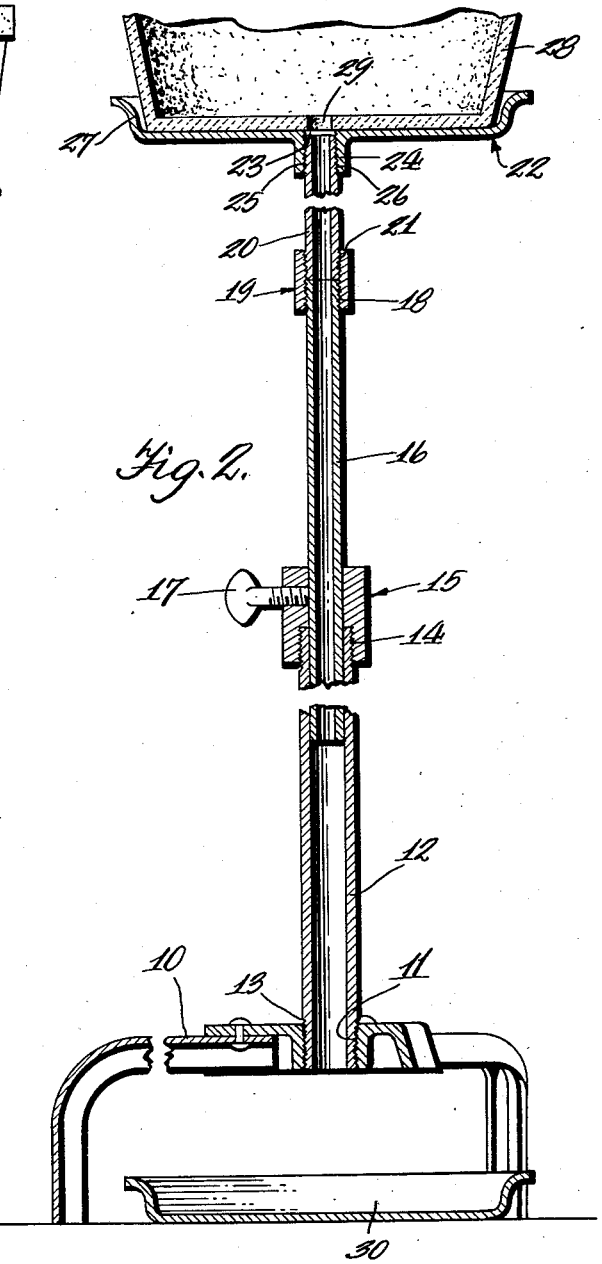
INVENTOR
Frank Witthuhn
BY
Ely & Barrow
ATTORNEYS Patented June 4, 1935

2,003,986

UNITED STATES PATENT OFFICE 2,003,986

ADJUSTABLE PLANT STAND

Frank Witthuhn, Cleveland, Ohio

Application April 7, 1934, Serial No. 719,471

4 Claims. (Cl. 47—39)

This invention relates to improvements in plant stands, basket or palm stands.

There are various types of plant stands now in use, which are adjustable as to height, while there are others providing means, for draining the water from flower pots mounted thereon. However, as far as I am aware, no one prior to my invention, has made an adjustable plant stand, which may be quickly and easily raised and lowered and provides drainage from a flower pot mounted thereon to a catch basin.

Florists frequently are called upon, to provide large displays of live plants and flowers for weddings, funerals, church services, and the like, where live plants are banked in solid mass displays or designs. The plants and flowers, thus displayed and arranged, are frequently kept in such places for days at a time, which, of course, necessitates the watering of the plants, while they are thus displayed. Where the plants are placed on ordinary tables, standards or racks, care must be taken, in watering the plants, to prevent the water from leaking out onto the furniture, carpets or various room furnishings.

When the florist is called upon to provide the types of live plant displays, heretofore referred to, he must be prepared to provide standards, racks, tables or other plant supporting means, which will support such plants at various heights and in various positions. The florist, therefore, must necessarily carry a large assortment of standards, racks, tables and the like, in order that he may be properly prepared to set up a large number of plants in such display forms or designs. Ordinarily, no means are provided, for carrying or shipping standards, racks or tables of the drainage type, in knockdown or compact form.

It, therefore, is an object of my invention, to provide a plant stand, which is readily adjustable as to height, and is combined with means for draining off the water from a flower pot carried thereon.

Another object is, to provide an adjustable plant stand formed of quickly and easily assembled parts, which may be carried by the florist or user in knockdown form and "nested", to effect an economy in transporting it to and from the plant displays.

Another object is, to provide an adjustable plant stand, which is adjustable to a relatively wide variety of heights, and may be manufactured at a low cost, due to the use of standard pipes, couplings and stamped parts.

Still another object is, to provide a strong, rugged and durable plant stand, which may be assembled or put together by any person, without special training or instructions.

Another object is, to provide a stand, adapted to use various types of drainage basins, so that ordinary dishes or receptacles may be used.

These and other objects will become apparent as the description proceeds.

In the accompanying drawing, forming a part of this specification, and in which like numerals are employed to designate like parts throughout the same.

Fig. 1 is a side elevation view of my improved plant stand showing a flower pot mounted thereon; while Fig. 2 is a central vertical section taken through Fig. 1, and drawn to a larger scale with parts broken away.

As shown in the drawing, the embodiment of my invention comprises a three-legged standard 10, provided centrally with a threaded aperture 11, receiving the lower end of a lower tube 12, having screwthreads 13 at its bottom end engaging the threads 11 for holding the lower tube 12 on the standard 10. The upper end of the lower tube 12 is externally threaded at 14, where an internally threaded coupling member 15 is mounted. An intermediate tube 16, telescopically mounted within the upper end of the lower tube 12, may be locked at any desired position therein by means of a set-screw 17, in an obvious manner. The telescopic mounting of the intermediate tube 16 in the lower tube 12, not only provides means for adjusting the height of the intermediate tube 16, but permits the latter to be packed in the lower tube 12, when the stand is taken apart for shipment from one job to another, thus effecting a material economy in shipping space.

The top end of the intermediate tube 16 is threaded at 18, where an internally threaded coupling member 19 is mounted on it, while an upper tube 20 having a threaded portion 21 engaging the threads at the top of the coupling member 19, supports at its top end a flower pot holder 22, which is provided centrally with an aperture 23, conveniently formed by a punching operation, producing a downwardly extending circular flange 24, provided internally with threads 25, engaging external threads 26 at the top end of the upper tube 20. The flower pot holder 22 is provided around its outer rim with an upwardly and outwardly extending flange 27 for holding a flower pot 28, of conventional design, having a central aperture 29 positioned above the central aperture 23 of the flower pot holder 22.

A drainage basin 30, is mounted on the floor under the standard 10, for receiving water draining from the flower pot 28 through the tubes 12, 16 and 20, and is of a design similar to the flower pot holder 22, but of slightly smaller diameter, thereby permitting it to be "nested" or fitted within the flower pot holder 22, to effect an economy in shipping space. Any ordinary receptacle such as a bowl or a dish may be used in place of the drainage basin 30, should such basin not be available.

The tubes 12, 16 and 20, and the coupling members 15 and 19, may consist of ordinary iron pipes and connections, used in the plumbing trade, while the flower pot holder 22 may be conveniently pressed from sheet iron. Should it be desirable to tilt the flower pot 28, for certain display work, one side of the bottom thereof may be placed on the flange 27.

My adjustable plant stand is adapted to be carried from job to job, in a knockdown form, and is assembled, where desired, for a plant display, by placing the standard 10 on the floor, and then screwing the threads 13 at the lower end of the lower tube 12, into the threaded aperture 11 of the standard 10. The lower end of the intermediate tube 16 is then placed within the top end of the lower tube 12. If additional height is desired, the upper tube 20 may be secured to the top of the intermediate tube 16 by screwing the coupling member 19 on the top thereof, and then the upper tube 20 is screwed into the top of the coupling member 19. The flower pot holder 22 is then mounted on the top of the upper tube 20, by engaging the threads 25 of the central flange 24, with the threads 26 on the top of the upper tube 20. A flower pot 28, containing a live plant, may then be placed on the holder 22, and the drainage basin 30 is slid under the standard at the bottom end of the lower tube 12, where it is adapted to receive water, draining from the flower pot 28 through the holder 22 and the cooperating tubes 20, 16 and 12. Vertical adjustment of the flower pot holder 22, to various heights, is effected by sliding the intermediate tube 16 in the lower tube 12, while set screw 17 permits the intermediate tube 16 to be locked at any desired position.

The stand is easily taken apart, in an obvious manner, to permit it to be stored by the florist or carried to another job. The drainage basin 30 may be "nested" or packed in the flower pot holder 22, which may then be placed under the standard 10, and the intermediate tube 16 may be slid into the lower tube 12.

It will be obvious to those skilled in the art that my invention may be changed, used or modified without departing from the spirit of my invention or sacrificing the advantages thereof. It furthermore will be obvious that the embodiment of my invention disclosed herein is illustrative only and that my invention is not limited thereto.

What is claimed is:

1. A plant stand, comprising a standard having spaced legs mounted on the floor, vertically adjustable communicating tubes having the bottom tube releasably mounted on the standard, a flower pot holder releasably mounted on the top tube and communicating with the tubes, and a catch basin adapted to be slid between legs of the standard for receiving water draining from the flower pot holder through the tubes, the catch basin being of such size and contour that it may be fitted within the flower pot holder when the standard is taken apart.

2. A plant stand, comprising a standard, tubing removably mounted on the standard at its lower end, a flower pot holder removably mounted on the upper end of the tubing and a catch basin, to catch water draining from the flower pot holder through the tubing, the catch basin being of such size and contour that it may be fitted within the flower pot holder when the standard is taken apart.

3. A plant stand, comprising a standard, a first tube mounted on the standard at its lower end, a second tube telescopically mounted within the top end of the first tube, a flower pot holder mounted on the top of the second tube, a set screw carried by the first tube and adapted to contact the second tube for releasably locking the second tube in the first tube, and a catch basin under the standard, to catch water draining from the flower pot holder through the tubes.

4. A plant stand, comprising a standard, a first tube screwthreadedly mounted on the standard at its lower end, a second tube telescopically mounted within the upper end of the first tube, a flower pot holder screwthreadedly mounted on the top of the second tube, means for releasably locking the second tube in the first tube, and a catch basin under the standard, to catch water draining from the flower pot holder through the tubes, the catch basin being of such size and contour that it may be fitted within the flower pot holder when the standard is taken apart.

FRANK WITTHUHN.